(12) United States Patent
Kearney et al.

(10) Patent No.: US 6,391,237 B1
(45) Date of Patent: May 21, 2002

(54) FORMATION OF INDICIA IN THE BASE OF A BLISTER PACK FOR TRANSFERENCE TO A BODY CAST THEREIN

(75) Inventors: Patrick Kearney; Mark Davies, both of Swindon (GB)

(73) Assignee: R. P. Scherer Technologies, Inc., Paradise Valley, NV (US)

( * ) Notice: Subject to any disclaimer, the term of this patent is extended or adjusted under 35 U.S.C. 154(b) by 0 days.

(21) Appl. No.: 09/507,250

(22) Filed: Feb. 18, 2000

Related U.S. Application Data

(63) Continuation of application No. PCT/GB98/02442, filed on Aug. 14, 1998.

(30) Foreign Application Priority Data

Aug. 18, 1997 (GB) .............................................. 9717491
Aug. 29, 1997 (GB) .............................................. 9718382

(51) Int. Cl.[7] ........................ B29C 33/40; B29C 51/08; B29C 51/14; B29C 59/02; B29C 71/02
(52) U.S. Cl. ....................... 264/132; 264/219; 264/234; 264/293; 264/299
(58) Field of Search ................................. 264/132, 219, 264/234, 293, 299

(56) References Cited

U.S. PATENT DOCUMENTS 4,001,440 A    1/1977  Hoyt
5,343,672 A    9/1994  Kearney et al.
5,457,895 A  * 10/1995 Thompson et al. ........... 34/296
5,729,958 A    3/1998  Kearney et al.
5,911,325 A  *  6/1999  Breitler ...................... 206/539

FOREIGN PATENT DOCUMENTS

| EP | 0 779 143 A1 | 6/1997 |
| WO | WO 97/10162 | 3/1997 |
| WO | WO 97/21534 | 6/1997 |

OTHER PUBLICATIONS

International search report for PCT/GB98/02442, mailed on Jun. 11, 1998.*

* cited by examiner

Primary Examiner—Leo B. Tentoni
(74) Attorney, Agent, or Firm—Donald D. Nickey

(57) ABSTRACT

A laminated film in which a metal foil is sandwiched between two polymeric films is cold formed to define one or more blisters, and the base of the blister stamped with indicia, in two discrete stages. The blister is formed in the first stage using a standard technique of advancing a pin in a direction transverse relative to the plane of the film. According to the invention, once the blister forming stage is completed, indicia are stamped into the base of the blister in the second stage by advancing a die from one side thereof to clamp the blister base against a mold held against the other side. The direction of the die and disposition of the die and mold may be selected such that the indicia project inwardly or outwardly from the blister base.

15 Claims, 3 Drawing Sheets

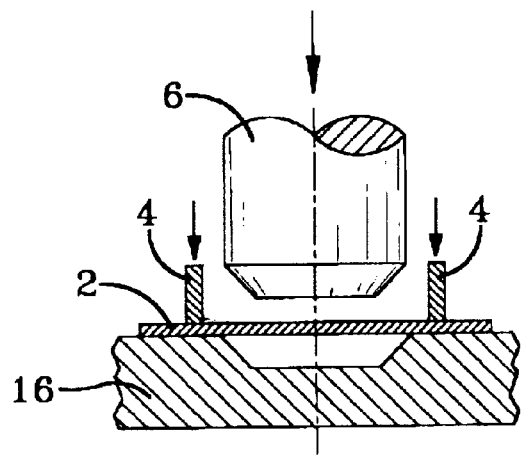
FIG-1A
FIG-1B
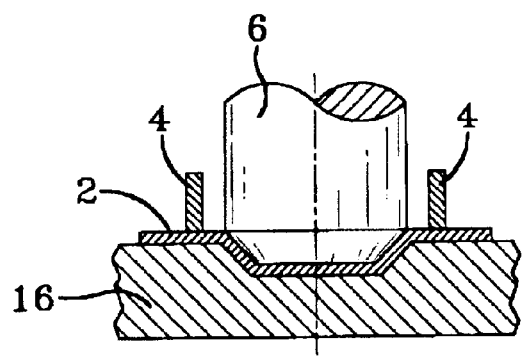
FIG-1C
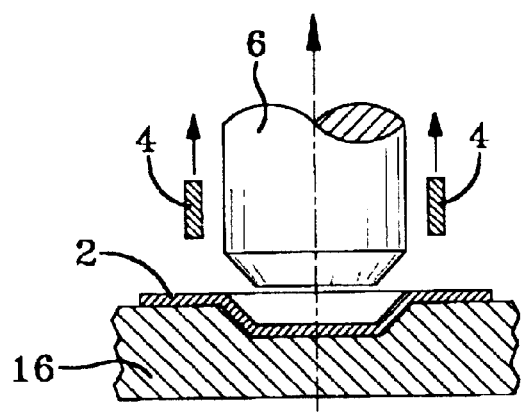
FIG-1D

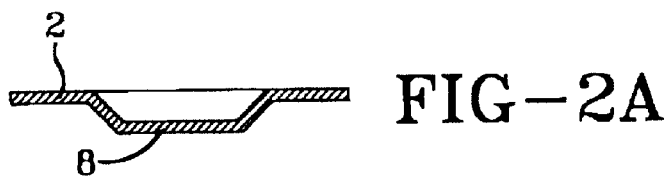
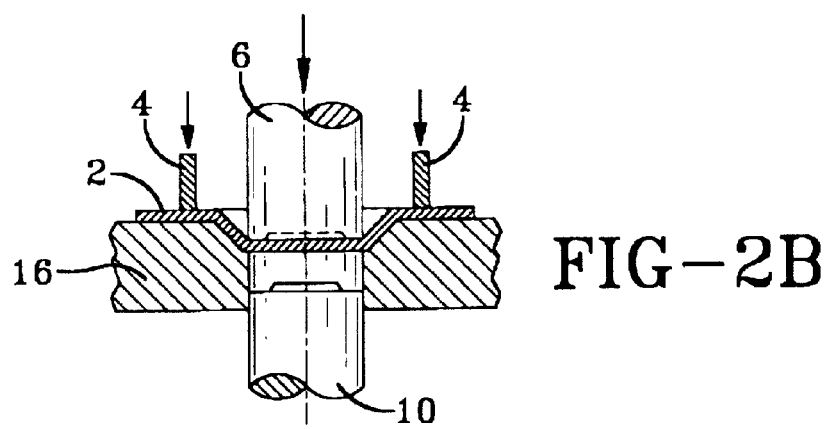
FIG-2A
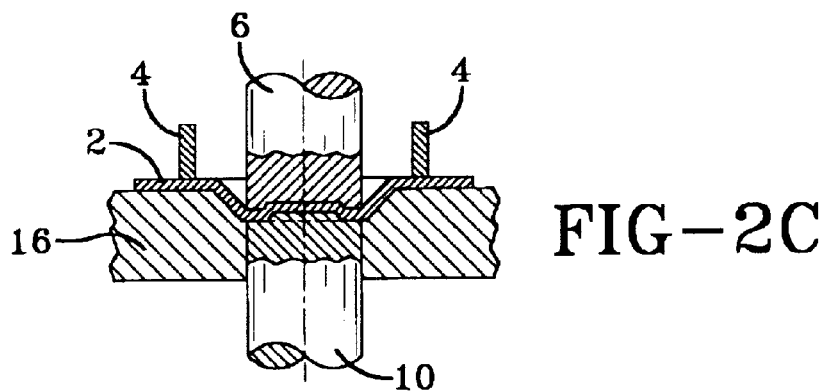
FIG-2B
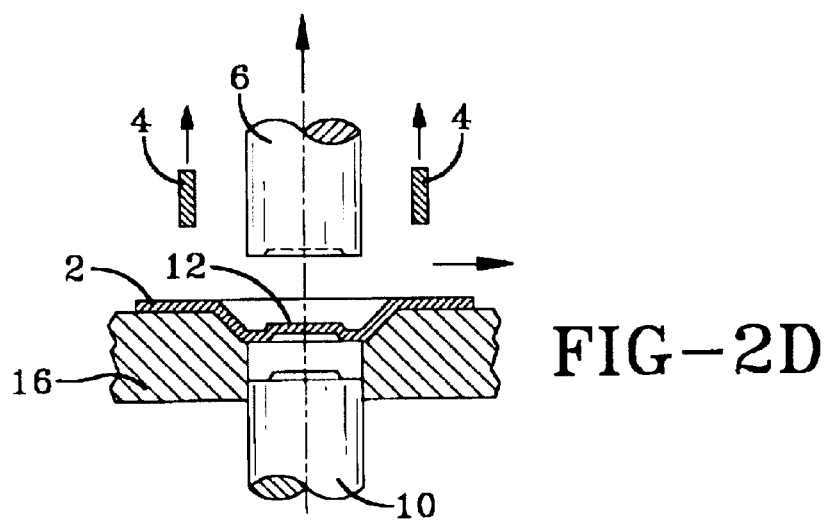
FIG-2C
FIG-2D

FORMATION OF INDICIA IN THE BASE OF A BLISTER PACK FOR TRANSFERENCE TO A BODY CAST THEREIN

RELATED APPLICATIONS

This application is a continuation of International Application No. PCT/GB98/02442 filed Aug. 14, 1998 which claims priority to Application No. GB 9718382.6; filed Aug. 29, 1997 and Application No. GB 9717491.6; filed Aug. 18, 1997.

TECHNICAL FIELD

This invention relates to the use of a laminated film to form blister packs in the blisters of which bodies such as fast dissolving dosage forms are cast. Such blister packs typically comprise polymeric films in which the blisters are heat formed. The present invention is particularly concerned with the use of laminated films in which a metal foil is sandwiched between two polymeric layers.

BACKGROUND OF THE INVENTION

Blister films are particularly suited for the casting of frangible bodies which comprise some pharmaceuticals. These bodies are commonly made using lyophilization or freeze-drying processes, but alternative techniques such as those including a solid state dissolution stage are also used. The liquid material of the body is poured into the blister or blisters, and then subjected to various treatments while still in the blisters. The products remain in the blister until they are ready for consumption and at this stage they are readily extractable.

Polymeric blister films suffer from the disadvantage of being permeable, with the consequence that however well the individual blisters are sealed, there is always a potential storage problem if the contents of the blister must be protected from the surrounding atmosphere. With the above points in mind, laminated blister films have been developed in which a metal foil is sandwiched between polymeric films on either side. Such films are less permeable than all-polymeric films, but some known films can become distorted when subjected to heat treatments, generating irregularities in the cast products and making subsequent handling of the blister pack more difficult. Although some laminated films have been developed which are more stable under heat treatment; see our published European Patent Specification Nos. 0 646 367 and 0 710 101, generally these laminated films are not suitable for the hot-forming of blisters therein. The metal foil core, normally of aluminum, is much better suited to cold forming.

There is currently a strong demand for products cast in blister films as described above to bear some indelible marking. To meet this demand, a hot formed blister can readily be adapted to bear indicia on its internal surface, which indicia are then reflected in the respective surface of the cast dosage form. However, with laminated foils of the kind to which this invention relates, it is difficult if not impossible to create indicia on the inner face of the blister base simultaneously with the formation of the blister itself.

SUMMARY OF THE INVENTION

In the present invention, a laminated film comprising a metal foil and a polymeric film on either side thereof is cold formed to define one or more blisters, and the base of the blister is then tamped with indicia, in two discrete stages. The blister is formed in the first stage using a standard technique of advancing a pin in a direction transverse relative to the plane of the film. However, according to the invention, once the blister forming stage is completed, indicia are stamped into the base of the blister in the second stage by advancing a die from one side thereof to clamp the blister base against a mold held against the other side. The direction of the die and disposition of the die and mold may be selected such that the indicia project inwardly or outwardly from the blister base.

Thus, there is disclosed a method of forming a laminated film comprising a metal foil and a polymeric layer on either side of the foil with at least one blister, the base of which bears projecting indicia for molding into a body cast therein, which method comprises cold-forming the blister by advancing a pin in a direction transversely relative to the plane of the film; and stamping the indicia into the base of the blister so formed by advancing a die in the opposite direction against a mold held against the inner face of the blister base.

There is further disclosed a method of forming a laminated film comprising a metal foil and a polymeric layer on either side of the foil with at least one blister, the base of which bears projecting indicia for molding into a body cast therein, which method comprises cold-forming the blister by advancing a pin in a direction transversely relative to the plane of the film; and stamping the indicia into the base of the blister so formed by advancing a die in the same direction against a mold held against the outer face of the blister base.

There is also disclosed a process for manufacturing a cast product comprising forming a blistered laminated film and casting the product in at least one of the blisters so that the indicia stamped into the blister base is reproduced on the corresponding face of the cast product.

Normally, in the practice of the invention the pin used in the formation of the blister itself will be a standard item with a plane flat end face across which the base of the blister is stretched. However, there can be circumstances in which the end face of the pin can be other than flat; for example, it can have the form of a shallow cone to assist in determining the manner in which the blister base is stretched. The end face of the pin can also have formed therein the mold against which a die is advanced to emboss the indicia into the blister base. However, it is normally preferred that during the initial blister formation step there is a continuous surfacing contact with the blister film across the end face of the pin and accordingly, if the mold is there, it will be filled or covered by a suitable blank. Alternatively of course, a quite different pin can be used and particularly in this variant, the blister formation step and the indicia formation step are conducted at different stations, although normally in the same machinery.

As noted above, the indicia formation step is quite separate from the blister formation step completed first, although both are cold forming steps. In some respects, the indicia formation step enables the laminates of the blister film itself to relax, and as a consequence the overall strength of the film and the blister itself can be enhanced.

A variety of arrangements and orientations of the die and mold in the indicia formation step can be adopted. For example, a die can be mounted in the pin used in the blister formation step, and advanced therefrom against the mold after the blister formation step is completed. In another arrangement, the mold can be formed in what is effectively a fixed body against which the blister if formed, with the die being moved to clamp the blister base against and into the mold thereafter.

Again as noted above, the present invention is particularly suitable for use in the manufacture of pharmaceutical products of a delicate construction, such as a fast dissolving dosage form, marketed by R. P. Scherer, Inc. of Basking Ridge, N.J. (USA) under the trademark Zydis®. By providing a means by which a permanent marking can be applied to such products, it is felt that a significant advance has been made.

BRIEF DESCRIPTION OF THE DRAWINGS

The invention will now be described by way of example and with reference to the accompanying schematic drawings, wherein:

FIGS. 1A to 1D show the steps in cold forming a blister in a blister film;

FIGS. 2A to 2D show the steps in the formation of indicia on the base of a blister so formed.

DETAILED DESCRIPTION OF THE PREFERRED EMBODIMENTS

Figure 3A:
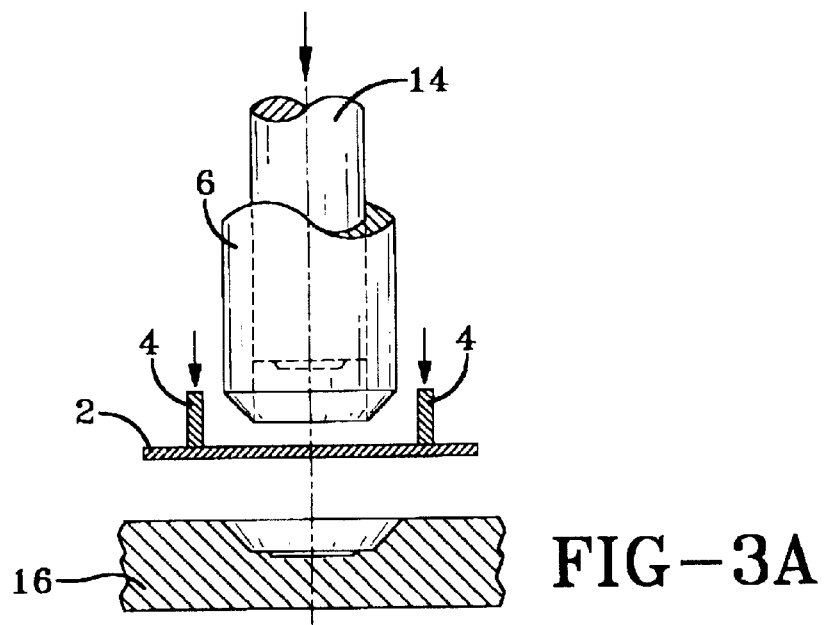
FIGS. 3A to 3C illustrate an alternative procedure to that described with reference to FIGS. 1 and 2.

Referring first to FIG. 1, a base film 2 is delivered to a blister forming station illustrated in FIGS. 2B to 2D. At the blister forming station, the film is held stationary by a clamp 4 around the periphery of the blister 8 (see FIG. 2A) to be formed, and a pin 6 advanced towards the film 2 to make a depression therein as shown in FIG. 1C. Once the formation step is completed, the pin 6 and clamps 4 are withdrawn, and the blister film 2 is either moved away entirely, or retained for further treatment.

The indicia formation stage is illustrated in FIGS. 2A to 2D. FIG. 2A shows in cross-section a blister film 2 formed with a blister 8. In FIG. 2B a pin 6 is shown advanced downwardly into the blister 8 and has a mold in the end face thereof against which the indicia 12 are formed. The pin 6 is held in place by a locking mechanism (not shown) while the die 10 is brought upwardly as shown to clamp the blister base thereagainst and emboss the indicia 12 thereinto. This stage is shown in FIG. 2C. Finally, the die 10 and mold are withdrawn releasing the blistered and embossed film 2 for transfer to the casting station.

Figure 3B:
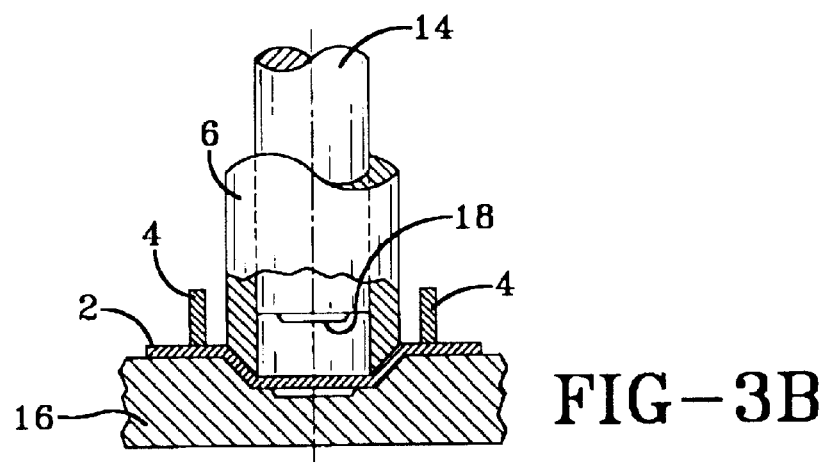
Figure 3C:
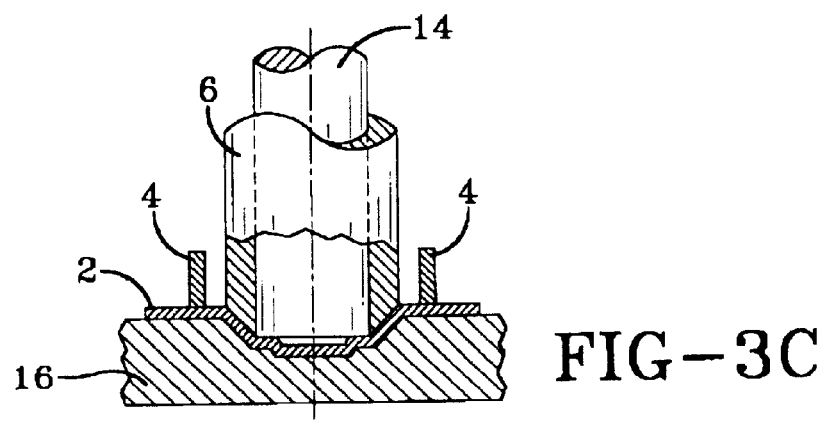

An alternative procedure is shown in FIGS. 3A, 3B and 3C. In this embodiment, the pin 6 has an auxiliary punch 14 slideably mounted therein. In the blister forming stage, the film 2 is held in place by clamp 4, and the pin 6 advanced to form the blister as in FIGS. 1A–1D. However, at the end of the pin 6 that engages the film, the face is open and the film stretched over the open face. The pin 6 is advanced until the stretched film is clamped against a platen 16 in which the indicia 12 (see FIG. 2D) are formed. In the indicia formation stage the punch 14 with a complementary die 18 in its end face is advanced in the pin 6 to mold the indicia in the film at the base of the blister. In this stage, the periphery of the blister base remains clamped between the pin 6 and the platen 16.

In the procedure shown in FIGS. 2A–2D the formed indicia 12 project into the blister from its base, and in the procedure shown in FIGS. 3A–3C the formed indicia project outwardly. However, it will be appreciated that the indicia may be formed in either orientation in both procedures. It will also be noted that in the FIGS. 3A–3C procedure the film will be stretched over a projecting die on the platen 16 in the blister formation stage before the punch 14 finally mold the indicia if the indicia are to project into the finally formed blister.

It should be understood that the invention applies to the application of indicia to be reflected in the respective surface of the cast product (e.g., the fast dissolving dosage form) in the broadest sense of the term. Thus, any form of marking is included, and particularly marking having a purely functional purpose such as the creation of break lines. Break lines are commonly used on tablets for oral administration where there is an occasional need for only a portion of a tablet to be taken at a particular time. The invention thus has particular value in the formation in a face of a product cast in a blister pack of indicia or marking which takes the form of or includes a break line. In this respect it will be appreciated that a break line can be effectively formed by a sequence of depressions or grooves; it does not have to be a continuous groove in all circumstances. What is important is that a line of weakness is formed which enables the cast product to be easily broken into two or more pieces as defined by the break line or lines.

Industrial Applicability

Fast dissolving dosage forms are becoming a popular form of pharmaceutical administration. Fast dissolving dosage forms enjoy advantages over conventional tablets and pills in that buccal and sublingual absorption of the drug can be accomplished, increased rate of patient compliance is realized and number others. One problem with fast dissolving dosage forms in the inability to print or affix numbers and/or letters to the article due to the physical characteristics of the dosage form itself The present invention provides an effective method to place indicia on fast dissolving dosage forms.

What is claimed is:

1. A method of forming a laminated film comprising a metal foil and a polymeric layer on either side of the foil with at least one blister the base of which bears projecting indicia for molding into a body cast therein, which method comprises cold-forming the blister by advancing a pin in a direction transversely relative to the plane of the film; and stamping the indicia into the base of the blister so formed by advancing a die in the opposite direction against a mold held against the inner face of the blister base.

2. The method according to claim 1 wherein the end of the pin matches the final outline shape of the blister.

3. The method according to claim 1 wherein the mold is formed in the end face of the pin used to cold form the blister.

4. The method according to claim 3 wherein during the formation of the blister the mold cavity is filled with an insert.

5. The method according to claim 1 wherein the mold is formed in the end face of a pin different from the pin used in the blister formation step.

6. A method of forming a laminated film comprising a metal foil and a polymeric layer on either side of the foil with at least one blister the base of which bears projecting indicia for molding into a body cast therein, which method comprises cold-forming the blister by advancing a pin in a direction transversely relative to the plane of the film; and stamping the indicia into the base of the blister so formed by advancing a die in the same direction against a mold held against the outer face of the blister base.

7. The method according to claim 6 wherein the die is mounted in the pin used in the blister formation step, and is advanced therefrom after the blister has been formed.

8. The method according to claim 6 wherein the blister is formed by advancing the pin to clamp the blister base against a fixed body, and wherein the die is advanced from one of the pin and body to force the blister base into the mold formed in the other of the pin and body.

9. The method according to claim 6 wherein the pin is formed with at least the periphery of its end face being lubricated or self-lubricating to facilitate the cold-forming of the film therearound.

10. The method according to claim 9 wherein the pin comprises polytetrafluoroethylene.

11. A process for manufacturing a cast product comprising forming a blistered laminated film using a method according to claim 1; and casting the product in said at least one blister such that the indicia stamped into the blister base are reproduced on the corresponding face of the cast product.

12. The process according to claim 11 wherein the cast product is a pharmaceutical.

13. The process according to claim 12 wherein the cast product is subjected to heat treatment in the mold.

14. The process according to claim 13 wherein the heat treatment comprises lyophilization.

15. The process according to claim 12 wherein the cast product is subjected to solid state dissolution in the mold.

* * * * *